(12) United States Patent
Ting

(10) Patent No.: US 8,738,904 B2
(45) Date of Patent: May 27, 2014

(54) ELECTRONIC DEVICES AND METHODS FOR SHARING ENCRYPTION SETTINGS IN DUAL OPERATING SYSTEMS

(71) Applicant: Wistron Corp., New Taipei (TW)

(72) Inventor: Tung-Sheng Ting, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/731,867

(22) Filed: Dec. 31, 2012

(65) Prior Publication Data

US 2013/0227269 A1 Aug. 29, 2013

Related U.S. Application Data

(60) Provisional application No. 61/602,569, filed on Feb. 23, 2012.

(30) Foreign Application Priority Data

Sep. 24, 2012 (TW) .............................. 101134873 A

(51) Int. Cl.
*H04L 29/06* (2006.01)

(52) U.S. Cl.
USPC ........................................................ 713/164

(58) Field of Classification Search
USPC ................... 713/100, 164, 166, 189, 193
See application file for complete search history.

(56) References Cited

U.S. PATENT DOCUMENTS

| | | | |
|---|---|---|---|
| 7,421,735 B2 * | 9/2008 | Kerstens et al. | 726/12 |
| 7,685,598 B1 * | 3/2010 | Badenell et al. | 718/104 |
| 8,549,326 B2 * | 10/2013 | Mohamed | 713/193 |
| 8,595,511 B2 * | 11/2013 | Aratsu et al. | 713/190 |
| 8,645,715 B2 * | 2/2014 | Dawson et al. | 713/193 |
| 2008/0177905 A1 | 7/2008 | Ohta et al. | |
| 2009/0058887 A1 | 3/2009 | Lin | |
| 2009/0059965 A1 | 3/2009 | Lin et al. | |
| 2009/0061838 A1 | 3/2009 | Lin | |
| 2009/0064186 A1 | 3/2009 | Lin | |
| 2009/0064195 A1 | 3/2009 | Chin et al. | |
| 2010/0172499 A1 * | 7/2010 | Sugiyama | 380/255 |
| 2013/0262862 A1 * | 10/2013 | Hartley | 713/165 |

OTHER PUBLICATIONS

US Patent Office, Office Action, U.S. Appl. No. 13/731,889, Mar. 13, 2014, US.

* cited by examiner

*Primary Examiner* — Beemnet Dada

(57) ABSTRACT

A method for sharing encryption settings in dual operating systems is provided. The method includes: activating and operating a first operating system; receiving system encryption settings from a user by the first operating system; recording a system encryption status value of the system encryption settings; switching to and activating a second operating system; checking whether a system encryption status value has been set when the second operating system attempts to enter a power saving mode, and when the system encryption status value has been set, temporarily switching to the first operating system and enabling the second operating system to enter the power saving mode; receiving a decryption input from the user by the first operating system; and if the decryption input matches the system encryption settings, switching from the first operating system to the second operating system and awaking the second operating system.

18 Claims, 2 Drawing Sheets

ELECTRONIC DEVICES AND METHODS FOR SHARING ENCRYPTION SETTINGS IN DUAL OPERATING SYSTEMS

CROSS REFERENCE TO RELATED APPLICATIONS

The application claims the benefit of U.S. Provisional Application 61/602,569, filed on Feb. 23, 2012 and claims priority under 35 U.S.C. §119(a) on Patent Application No(s). 101134873, filed in Taiwan, Republic of China on Sep. 24, 2012, the entire contents of which are hereby incorporated by reference.

BACKGROUND OF THE INVENTION

1. Field of the Invention

The present invention relates to dual operating system architectures, and in particular, relates to techniques for sharing encryption settings in dual operating systems.

2. Description of the Related Art

Portable electronic devices, such as notebook computers and smartphones, have become indispensable for modern day humans.

Conventionally, the operating system of the electronic devices which is mostly used is the Microsoft Windows operating system (OS). Nowadays, however, the Android OS, which is based on a Linux operating system, is also popularly used. The two operating systems perform differently with different operations. In order to take advantage of both of the operating systems, some designs integrate the two operating systems into a single one electronic device. In some designs, the electronic device has only one CPU that processes instructions for dual operating systems, while in some other designs, separate CPUs are respectively in charge of one of the operating systems. Generally, in a dual operating system architecture, only one of the operating systems will be in operation while the other will stay in a sleep state at the same time. In the manner, the dual operating systems can share resources with each other and unnecessary conflicts may be prevented.

To ensure the security of information, encrypting and decrypting sensitive information by entering an account name and a password is common. However, in the prior art, each of the dual operating systems respectively asks the user to encrypt and decrypt same objects. When a user inadvertently uses different encryption settings in different operating systems for encrypting a same object, the probability that the user will enter a wrong account name and password, significantly increases, which causes inconvenience for the user.

BRIEF SUMMARY OF THE INVENTION

The present invention provides a method for sharing encryption settings in dual operating systems. The method comprises: activating and operating a first operating system; receiving system encryption settings from a user by the first operating system; recording a system encryption status value of the system encryption settings; switching to and activating a second operating system; checking whether a system encryption status value has been set when the second operating system attempts to enter a power saving mode; when the system encryption status value has been set, temporarily switching to the first operating system and enabling the second operating system to enter the power saving mode; receiving a decryption input from the user by the first operating system; if the decryption input matches the system encryption settings, switching from the first operating system to the second operating system and awaking the second operating system.

The present invention provides an electronic device. The electronic device comprises: a first operating system, for receiving system encryption settings from a user; a second operating system; a first synchronization manager, operating under the first operating system; a second synchronization manager, operating under the second operating system; a transmission interface, coupled between the first synchronization manager and the second synchronization manager, for transmitting a notification message between the first synchronization manager and the second synchronization manager for switching between the first operating system and the second operating system; and a controller, coupled to the first synchronization manager, the second synchronization manager and at least one peripheral device, for: storing a system encryption status value produced when the first operating system performs the system encryption settings, and after the first operating system activates and switches to the second operating system and at the time when the second operating system attempts to enter a power saving mode and when detecting that the system encryption status value has been set, switching to the first operating system to perform a encryption/decryption comparison, and then switching from the first operating system back to the second operating system and awaking the second operating system. A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. The description is made for the purpose of illustrating the general principles of the invention and should not be taken in a limiting sense. The scope of the invention is best determined by reference to the appended claims.

To overcome the problem in the prior art where dual operating systems cannot share encryption settings, the present invention provides a new dual operating system architecture, and a new method for sharing encryption settings in a dual operating system.

Dual Operating System Architecture

Figure 1:
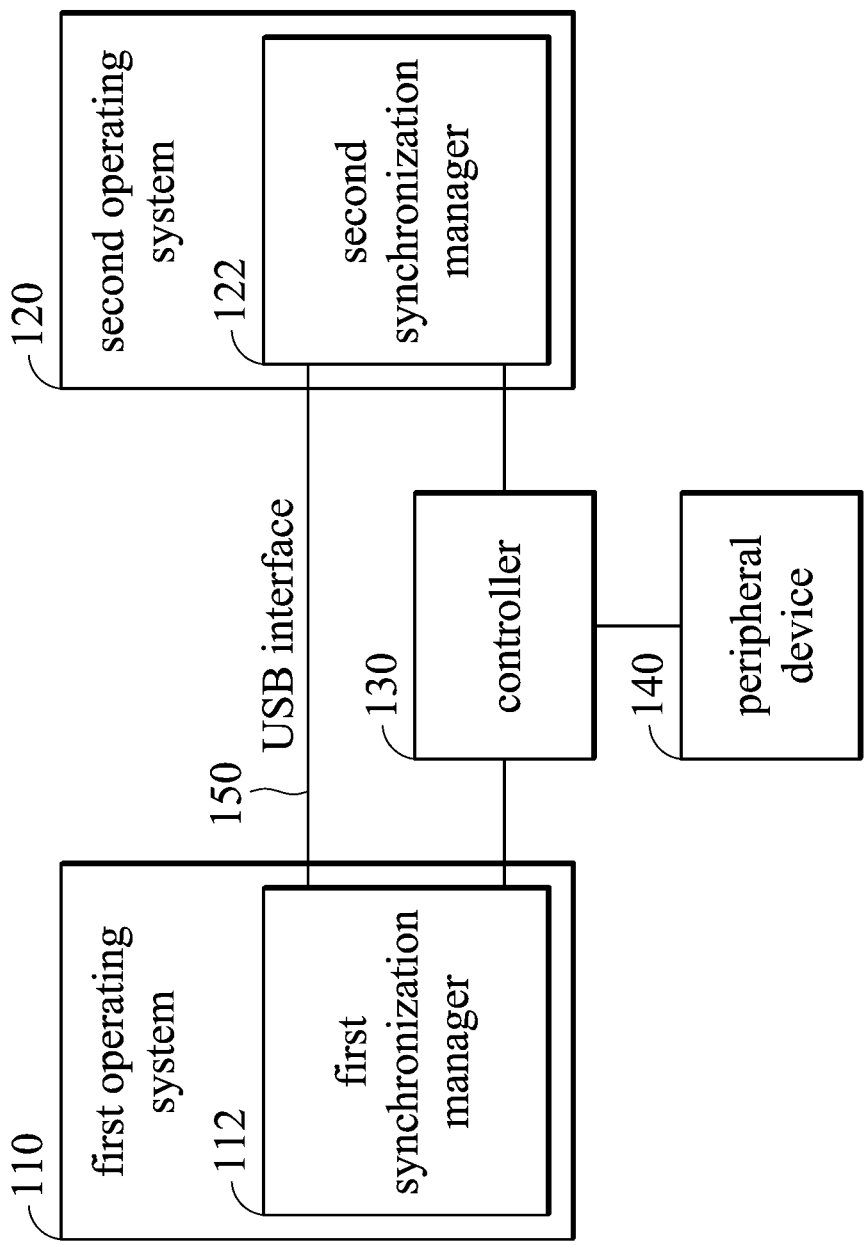
FIG. 1 is a schematic diagram of an electronic device which operates dual operating system architecture according to an embodiment of the present invention.

FIG. 1 is a schematic diagram of an electronic device which operates dual operating systems according to an embodiment of the present invention. The electronic device 100 of the present invention can be a notebook computer or a smart phone, which comprises: a first operating system 110, a second operating system 120, a controller 130 and a peripheral device 140. For example, the first operating system 110 can be a Windows operating system, and the second operating system 120 can be an Android operating system. However, the present invention is not limited to the example, and can be applied to various operating systems. The controller 130 of the present invention, for example, is an independent embedded (EC), which is coupled to the two operating systems 110 and 120 and the peripheral device 140, and can be used to control the peripheral device 140 according to commands issued from the two operating systems 110 and 120. The peripheral device 140 of the present invention comprises various input/output devices such as keyboards, mice, touchpads, trackballs, trackpoints, displays, speakers, headsets, and cameras, etc. (not shown in FIG. 1). The peripheral device 140 can be used to perform various specific functions. It is noted that the two operating systems 110 and 120 can share the peripheral device 140 via the independent controller 130.

In a preferred embodiment, there is first synchronization manager 112 running under a the first operating system 110, and a second synchronization manager 122 running under the second operating system 120. The synchronization managers 112 and 122 can be used to coordinate the switching and data synchronization between the operating systems 110 and 120. In the embodiment, the synchronization managers 112 and 122 are not only coupled to the controller 130, but also coupled to each other via a transmission interface 150. For example, The transmission interface 150 is a universal serial bus (USB) interface. With the USB interface 150, the operating systems 110 and 120 can exchange information more directly, and the probability of conflict between the two operating systems can thus be reduced. The USB interface is merely for illustration, and the present invention should not be limited thereto. To simplify the description hereinafter, when an operating system (e.g., the first operating system 110) receives a command for switching between operating systems from a user, it directly transmits a notification message to another operating system (e.g., the second operating system 120) via the transmission interface 150, thus activating or awaking it.

The electronic device 110 with the dual operating system architecture described above can be used to perform the method of the present invention to share encrypting settings in dual operating systems. Each step of the method of the present invention will be described in accordance with FIGS. 1-2 in the following.

Method for Sharing Encryption Settings in Dual Operating Systems

Figure 2:
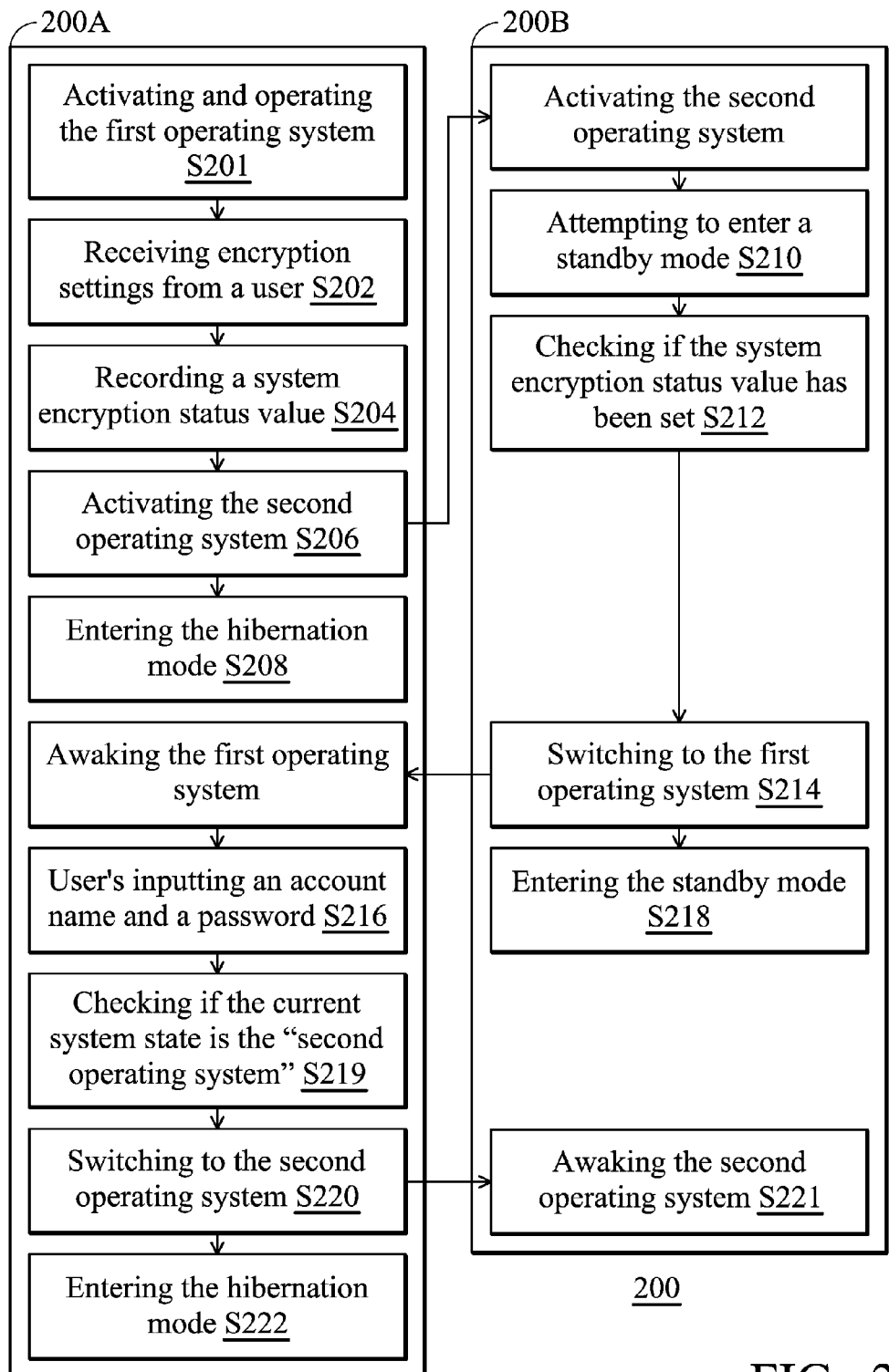
FIG. 2 is a flow chart of the method for sharing encryption settings in dual operating systems according to the first embodiment of the present invention.

FIG. 2 is a flow chart of the method for sharing encryption settings in dual operating systems according to the first embodiment of the present invention. Please refer to FIGS. 1 and 2. The method 200 of the present invention can be performed in the electronic device 100 described above, and can be divided into two processes: process 200A, which is performed by the first synchronization manager 112 under the first operating system 110; and process 200B, which is performed by the second synchronization manager 122 under the second operating system 120. For illustration, the processes 200A and 200B are respectively shown in different blocks in FIG. 2. Note that although in the embodiment the encryption procedure is performed in the first operating system for illustration, the manner can be adaptively applied to that in the second operating system.

Firstly, the first operating system is activated and operating in step S201. The process 200A of the first operating system 110 comprises steps S202 and S204. In step S202, the first operating system 110 receives encryption settings from a user. Specifically, the encryption settings are user account names and passwords for various encryption requirements. For example, the encrypted object can be the system use permission, peripheral device use permission or network logon permission, etc., which are all within the scope of the present invention. After step S202, the present invention performs a special step S204. In step S204, if the system state is set as "first operating system", the first operating system 110 records a system encryption status value in the controller 130 via a interface (for example, the WMI interface in Windows operating system), where the system encryption status value indicates which operating system the account name and password is set for. For illustration, the account name and password in the embodiment are set under the first operating system 110. In a preferred embodiment, the system encryption status value is recorded in the controller 130 so as to be easily acquired by both of the operating systems 110 and 120. Then, in step S206, the first operating system 110, after receiving a command for switching between operating systems for a user (for example, the user presses designated keys on the keyboard or clicks a designated object on a display interface to issue the command), transfers the control right of the electronic device 100 from the first operating system 110 to the second operating system 120, and then enters a hibernation mode in step S208.

After receiving the command for switching to the second operating system 120, The controller 130 activates the second operating system (step S206), and the second operating system 120 then requests the controller 130 to transfer the control right of the peripheral device 140 to the second operating system 120. At the same time, the system state is reset as "second operating system". The second operating system 120 may then attempt to enter a standby/sleep mode in step S210. Therefore, in step S212, the system encryption status value stored in the controller 130 is checked, so that it can be determined whether the encryption settings have been updated by the first operating system 110. If no, the second operating system 120 enters the standby mode directly. If yes, the control right of the peripheral device 140 is transferred to the first operating system 110 (step S214) in advance, then the second operating system enters the standby mode (step 218).

Afterwards, once the user attempts to use the computer system (for example, by pressing the power button), the first operating system 110 is awaken (step S214), then the first operating system 110 displays an input interface for the user to input an account name and a password (step S216). When the user inputs the correct account name and password, and the system state is the "second operating system" (step S219), and the control right of the electronic device 100 (step S220) is then transferred back to the second operating system 120 from the first operating system 110. Therefore, the second operating system 120 is awaken (step S221) and in a normal mode, while the first operating system 110 enters the sleep mode again (step S222). With the system encryption status value and the design for temporary switching systems described above, the encryption settings for a same object can be all managed by the same operating system; thus, preventing disorders caused by repeated encryptions in the prior art, and improving user convenience.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for sharing encryption settings in dual operating systems, comprising:

activating and operating a first operating system;

receiving system encryption settings from a user by the first operating system;

recording a system encryption status value of the system encryption settings;

switching to and activating a second operating system;

checking whether a system encryption status value has been set when the second operating system attempts to enter a power saving mode;

when the system encryption status value has been set, temporarily switching to the first operating system and enabling the second operating system to enter the power saving mode;

receiving a decryption input from the user by the first operating system;

if the decryption input matches the system encryption settings, switching from the first operating system to the second operating system and awaking the second operating system.

2. The method for sharing encryption settings in dual operating systems as claimed in claim 1, wherein the system encryption status value is recorded in a controller.

3. The method for sharing encryption settings in dual operating systems as claimed in claim 1, wherein, when the first operating system is switched to the second operating system, the first operating system directly transmits a notification message to the second operating system via a transmission interface to switch to the second operating system.

4. The method for sharing encryption settings in dual operating systems as claimed in claim 1, wherein a power saving mode is entered into after the first operating system is switched to the second operating system.

5. The method for sharing encryption settings in dual operating systems as claimed in claim 4, wherein the power saving mode in which the first operating system enters is a hibernation mode.

6. The method for sharing encryption settings in dual operating systems as claimed in claim 1, wherein the power saving mode in which the second operating system enters is a standby/sleep mode.

7. The method for sharing encryption settings in dual operating systems as claimed in claim 1, wherein the first operating system displays an input interface for receiving the decryption input.

8. The method for sharing encryption settings in dual operating systems as claimed in claim 1, wherein the encryption settings of the first operating system comprise a user account name and a password.

9. The method for sharing encryption settings in dual operating systems as claimed in claim 1, wherein the step of checking whether a system encryption status value has been set further comprises:

transferring the control right of at least one peripheral device from the second operating system to the first operating system, wherein state of the current system is still the second operating system.

10. The method for sharing encryption settings in dual operating systems as claimed in claim 9, further comprising:

if the decryption input matches the system encryption settings, determining in advance whether the state of the current system is the second operating system, and then transferring the control right of the at least one peripheral device from the first operating system back to the second operating system.

11. An electronic device, comprising:

a first operating system, for receiving system encryption settings from a user;

a second operating system;

a first synchronization manager, operating under the first operating system;

a second synchronization manager, operating under the second operating system;

a transmission interface, coupled between the first synchronization manager and the second synchronization manager, for transmitting a notification message between the first synchronization manager and the second synchronization manager for switching between the first operating system and the second operating system; and a controller, coupled to the first synchronization manager, the second synchronization manager and at least one peripheral device, for:

storing a system encryption status value produced when the first operating system performs the system encryption settings, and after the first operating system activates and switches to the second operating system and at the time when the second operating system attempts to enter a power saving mode and when detecting that the system encryption status value has been set, switching to the first operating system to perform a encryption/decryption comparison, and then switching from the first operating system back to the second operating system and awaking the second operating system.

12. The electronic device as claimed in claim 11, wherein the first operating system enters a power saving mode after switching to the second operating system.

13. The electronic device as claimed in claim 12, wherein the power saving mode in which the first operating system enters is a hibernation mode.

14. The electronic device as claimed in claim 11, wherein the power saving mode in which the second operating system enters is a standby/sleep mode.

15. The electronic device as claimed in claim 11, wherein the encryption/decryption comparison is to compare if the decryption input matches the system encryption settings.

16. The electronic device as claimed in claim 15, wherein the first operating system displays an input interface for receiving the decryption input.

17. The electronic device as claimed in claim 11, wherein the encryption settings of the first operating system comprise a user account name and a password.

18. The electronic device as claimed in claim 11, wherein, when the system encryption status value has been set, the control right of the at least one peripheral device is transferred from the second operating system to the first operating system.

* * * * *